(12) United States Patent
Jiang et al.

(10) Patent No.: US 10,064,122 B2
(45) Date of Patent: Aug. 28, 2018

(54) METHOD FOR SELECTING PUBLIC LAND MOBILE NETWORK PLMN, AND APPARATUS AND DEVICE THEREOF

(71) Applicant: HUAWEI TECHNOLOGIES CO., LTD., Shenzhen (CN)

(72) Inventors: Yinqing Jiang, Wuhan (CN); Bei Dai, Wuhan (CN); Xiaojian Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/316,731

(22) PCT Filed: Jun. 27, 2014

(86) PCT No.: PCT/CN2014/080985
§ 371 (c)(1),
(2) Date: Dec. 6, 2016

(87) PCT Pub. No.: WO2015/196465
PCT Pub. Date: Dec. 30, 2015

(65) Prior Publication Data
US 2017/0164270 A1 Jun. 8, 2017

(51) Int. Cl.
*H04W 48/14* (2009.01)
*H04W 48/16* (2009.01)
(Continued)

(52) U.S. Cl.
CPC .......... *H04W 48/14* (2013.01); *H04B 17/318* (2015.01); *H04W 48/16* (2013.01); *H04W 48/18* (2013.01); *H04W 60/04* (2013.01)

(58) Field of Classification Search
CPC .................................................. H04W 48/14
(Continued)

(56) References Cited

U.S. PATENT DOCUMENTS 6,125,146 A * 9/2000 Frencken ............. H04N 19/176
348/420.1
6,826,414 B1 * 11/2004 Reynolds ............. H04W 48/02
455/432.1
(Continued)

FOREIGN PATENT DOCUMENTS

| CN | 101657005 A | 2/2010 |
|----|-------------|--------|
| CN | 102395175 A | 3/2012 |
| CN | 102724736 A | 10/2012 |

OTHER PUBLICATIONS

3GPP TS 23.122 V12.4.0 (Mar. 2014), 3rd Generation Partnership Project;Technical Specification Group Core Network and Terminals;Non-Access-Stratum (NAS) functions related to Mobile Station (MS) in idle mode(Release 12), 45 pages.
(Continued)

*Primary Examiner* — Michael T Vu
(74) *Attorney, Agent, or Firm* — Conley Rose, P.C.

(57) ABSTRACT

Embodiments of the present disclosure provide a method for selecting a public land mobile network PLMN, and an apparatus and a device for same. The method includes: during a process of selecting a network by a mobile terminal, if it is learned by means of determining that a registered public land mobile network RPLMN and a home public land mobile network HPLMN correspond to the mobile terminal are unavailable, acquiring a PLMN network in a PLMN list pre-stored in the mobile terminal, to perform a registration, wherein the PLMN list includes network information of one or more other PLMN networks that are selected and successfully registered.

10 Claims, 4 Drawing Sheets

---

During a process of selecting a network by a mobile terminal, learn by means of determining that an RPLMN and an HPLMN that correspond to the mobile terminal are unavailable — 101

Acquire a PLMN network in a PLMN list pre-stored in the mobile terminal, to perform registration, where the PLMN list includes network information of one or more other PLMN networks that are selected and successfully registered with before — 102

(51) Int. Cl.
*H04W 48/18* (2009.01)
*H04B 17/318* (2015.01)
*H04W 60/04* (2009.01)

(58) Field of Classification Search
USPC .............................................. 455/434–435.2
See application file for complete search history.

(56) References Cited

U.S. PATENT DOCUMENTS

| 2011/0124335 A1* | 5/2011 | Martin | G01S 5/0205 |
| | | | 455/434 |
| 2011/0177810 A1* | 7/2011 | Kim | H04W 48/18 |
| | | | 455/432.1 |

OTHER PUBLICATIONS

International Search Report (including English translation) issued in corresponding International Application No. PCT/CN2014/080985, dated Mar. 25, 2015, 6 pages.

* cited by examiner

METHOD FOR SELECTING PUBLIC LAND MOBILE NETWORK PLMN, AND APPARATUS AND DEVICE THEREOF

CROSS-REFERENCE TO RELATED APPLICATIONS

This application is a National Stage of International Application No. PCT/CN2014/080985, filed on Jun. 27, 2014, which is hereby incorporated by reference in its entirety.

TECHNICAL FIELD

Embodiments of the present disclosure relate to the field of wireless communications technologies, and in particular, to a method for selecting a public land mobile network PLMN, and an apparatus and a device for same.

BACKGROUND

A public land mobile network (Public Land Mobile Network, PLMN for short) is a network established and operated by a government or an operator authorized by the government, to provide a land mobile communications service for the public. The PLMN is identified by using a mobile country code (Mobile Country Code, MCC for short) and a mobile network code (Mobile Network Code, MNC for short).

If a mobile terminal needs to acquire network services such as voice, data, and multimedia, the mobile terminal first needs to select a suitable PLMN and search for a cell within the coverage of the PLMN, and after finding an available cell, the mobile terminal camps on the cell and initiates registration. The 3rd Generation Partnership Project (The 3rd Generation Partnership Project, 3GPP for short) TS23.122 Protocol stipulates that during automatic network selection, a mobile terminal selects a suitable PLMN according to the following sequence: a registered public land mobile network (Registered PLMN, RPLMN for short), a home public land mobile network (Home PLMN, HPLMN for short), a user controlled public land mobile network (User Controlled PLMN, UPLMN for short), an operator controlled public land mobile network (Operator Controlled PLMN, OPLMN for short), and other PLMNs (Other PLMNs), to register with the network.

However, in the prior art, when the RPLMN and the HPLMN are unavailable, if an automatic network selection mode is used, the mobile terminal randomly sorts PLMNs having good signal quality, and sorts, according to values of signal strength, PLMNs having poor signal quality. In this case, a case in which a forbidden PLMN (Forbidden PLMN, FPLMN for short) having best signal quality has a highest priority and therefore is selected by the mobile terminal to register with the network may occur, and consequently, the mobile terminal needs to select a PLMN and search for a cell multiple times before succeeding in registration. Therefore, network registration performed by the mobile terminal has a relatively low speed and relatively low efficiency.

SUMMARY

Embodiments of the present disclosure provide a method for selecting a public land mobile network PLMN, and an apparatus and a device for same, to improve a speed and efficiency of network registration performed by a mobile terminal.

According to a first aspect, an embodiment of the present disclosure provides a method for selecting a public land mobile network PLMN, including:

during a process of selecting a network by a mobile terminal, if it is learned by means of determining that a registered public land mobile network RPLMN and a home public land mobile network HPLMN that correspond to the mobile terminal are unavailable, acquiring a PLMN network in a PLMN list pre-stored in the mobile terminal, to perform registration, where the PLMN list includes network information of one or more other PLMN networks that are selected and successfully registered with before.

With reference to the first aspect, in a first possible implementation manner of the first aspect, the network information of one or more other PLMN networks that are selected and successfully registered with before includes network information of one or more other PLMN networks that are manually selected by a user and successfully registered with before.

With reference to the first possible implementation manner of the first aspect, in a second possible implementation manner of the first aspect, the network information includes a mobile country code MCC, a mobile network code MNC, and standard information that correspond to the PLMN network.

With reference to the second possible implementation manner of the first aspect, in a third possible implementation manner of the first aspect, the network information of each PLMN network included in the PLMN list is dynamically adjusted according to a least recently used LRU algorithm.

With reference any one of the first to the third possible implementation manners of the first aspect, in a fourth possible implementation manner of the first aspect, the method further includes:

during a process of manually selecting a PLMN network by the user, identifying an unavailable PLMN network among all found PLMN networks.

With reference to the fourth possible implementation manner of the first aspect, in a fifth possible implementation manner of the first aspect, after the identifying an unavailable PLMN network among all found PLMN networks, the method further includes: displaying all the PLMN networks in the following sequence: an HPLMN or an equivalent home public land mobile network EHPLMN, a PLMN list, a user selected public land mobile network UPLMN or an operator provided public land mobile network OPLMN, an RPLMN, other PLMNs, and a forbidden public land mobile network FPLMN, where the FPLMN is an unavailable PLMN.

With reference to the fifth possible implementation manner of the first aspect, in a sixth possible implementation manner of the first aspect, the other PLMNs are sorted according to the following method:

randomly sorting, according to signal strength, PLMNs whose signal strength is higher than a preset value; and sorting, according to signal strength in descending order, PLMNs whose signal strength is lower than the preset value.

According to a second aspect, an embodiment of the present disclosure provides an apparatus for selecting a public land mobile network PLMN, including:

a determining module, configured to: during a process of selecting a network by a mobile terminal, determine whether a registered public land mobile network RPLMN and a home public land mobile network HPLMN that correspond to the mobile terminal are available; and a selection module, configured to: when it is learned that the RPLMN and the HPLMN that correspond to the mobile terminal are unavailable, acquire a PLMN network in a PLMN list pre-stored in the mobile terminal, to perform registration, where the PLMN list includes network information of one or more other PLMN networks that are selected and successfully registered with before.

With reference to the second aspect, in a first possible implementation manner of the second aspect, the network information of one or more other PLMN networks that are selected and successfully registered with before includes network information of one or more other PLMN networks that are manually selected by a user and successfully registered with before.

With reference to the first possible implementation manner of the second aspect, in a second possible implementation manner of the second aspect, the network information includes a mobile country code MCC, a mobile network code MNC, and standard information that correspond to the PLMN network.

With reference to the second possible implementation manner of the second aspect, in a third possible implementation manner of the second aspect, the apparatus further includes:

an adjustment module, configured to dynamically adjust, according to a least recently used LRU algorithm, the network information of each PLMN network included in the PLMN list.

With reference any one of the first to the third possible implementation manners of the second aspect, in a fourth possible implementation manner of the second aspect, the apparatus further includes:

a processing module, configured to: during a process of manually selecting a PLMN network by the user, identify an unavailable PLMN network among all found PLMN networks.

With reference to the fourth possible implementation manner of the second aspect, in a fifth possible implementation manner of the second aspect, the apparatus further includes:

a display module, configured to display all the PLMN networks in the following sequence: an HPLMN or an equivalent home public land mobile network EHPLMN, a PLMN list, a user selected public land mobile network UPLMN or an operator provided public land mobile network OPLMN, an RPLMN, other PLMNs, and a forbidden public land mobile network FPLMN, where the FPLMN is an unavailable PLMN.

With reference to the fifth possible implementation manner of the second aspect, in a sixth possible implementation manner of the second aspect, the apparatus further includes:

a first sorting module, configured to randomly sort, according to signal strength, PLMNs whose signal strength is higher than a preset value; and a second sorting module, configured to sort, according to signal strength in descending order, PLMNs whose signal strength is lower than the preset value.

According to a third aspect, an embodiment of the present disclosure provides a mobile terminal, including a processor and a memory, where the memory stores an execution instruction; and when the mobile terminal runs, the processor communicates with the memory, and the processor executes the execution instruction, so that the mobile terminal executes the method according to the first aspect or any one of the first to the sixth possible implementation manners of the first aspect.

The embodiments of the present disclosure provide a method for selecting a public land mobile network PLMN, and an apparatus and a device for same. During a process of selecting a network by a mobile terminal, when the mobile terminal learns by means of determining that a registered public land mobile network RPLMN and a home public land mobile network HPLMN that correspond to the mobile terminal are unavailable, the mobile terminal acquires a PLMN network in a PLMN list pre-stored in the mobile terminal, to perform registration. Because the PLMN list includes network information of one or more other PLMN networks that are selected and successfully registered with before, during network selection, the mobile terminal does not randomly select a PLMN network to perform registration, and therefore, a speed and efficiency of network registration performed by the mobile terminal are improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
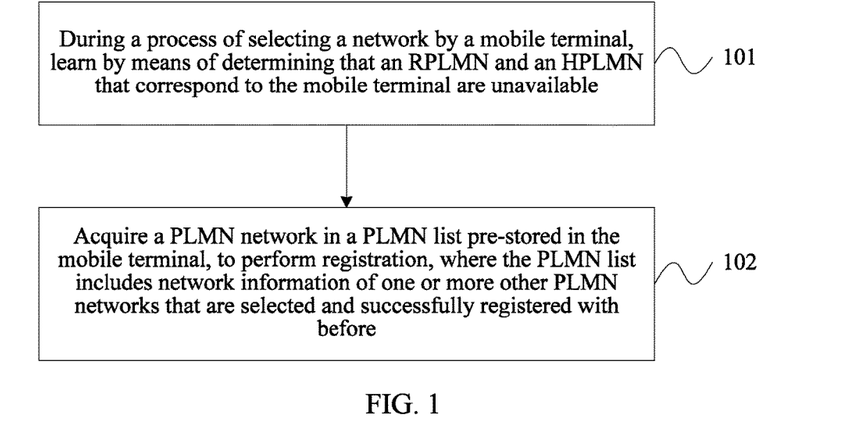
FIG. 1 is a flowchart of Embodiment 1 of a method for selecting a public land mobile network PLMN according to the present invention.

FIG. 1 is a flowchart of Embodiment 1 of a method for selecting a public land mobile network PLMN according to the present invention. As shown in FIG. 1, the method of this embodiment may include:

Step 101: During a process of selecting a network by a mobile terminal, learn by means of determining that a registered public land mobile network RPLMN and a home public land mobile network HPLMN that correspond to the mobile terminal are unavailable.

Specifically, after the mobile terminal is turned on, a network access server (Network Access Server, NAS for short) initiates a PLMN selection request, to select a suitable PLMN, searches for a cell within the coverage of the PLMN, and if an available cell is found, camps on the cell and initiates network registration. According to a stipulation in an existing protocol, the mobile terminal automatically selects a network according to the following sequence: an RPLMN, an HPLMN, a UPLMN, an OPLMN, and other PLMNs. When the mobile terminal loses network coverage or is in a roaming state, the mobile terminal determines whether the RPLMN or the HPLMN is available. If the RPLMN or the HPLMN is available, the mobile terminal selects the RPLMN or the HPLMN to perform registration. If learning that the RPLMN or the HPLMN is unavailable, the mobile terminal reselects a network to perform registration.

Step 102: Acquire a PLMN network in a PLMN list pre-stored in the mobile terminal, to perform registration, where the PLMN list includes network information of one or more other PLMN networks that are selected and successfully registered with before.

In this embodiment, based on an existing PLMN, the mobile terminal records the network information of the one or more other PLMN networks that are selected and successfully registered with before, to establish the PLMN list. When selecting a network, the mobile terminal performs selection according to the following sequence: an RPLMN, an HPLMN, a PLMN list, a UPLMN, an OPLMN, and other PLMNs, and attempts to register with a PLMN. When the mobile terminal loses network coverage or is in a roaming state, that is, when the mobile terminal learns by means of determining that the RPLMN and the HPLMN are unavailable, the mobile terminal selects a PLMN network in the PLMN list to perform registration, so that the mobile terminal can register with an available network within a shortest time, thereby improving registration efficiency.

According to the method for selecting a public land mobile network PLMN provided in this embodiment of the present invention, during a process of selecting a network by a mobile terminal, when the mobile terminal learns by means of determining that a registered public land mobile network RPLMN and a home public land mobile network HPLMN that correspond to the mobile terminal are unavailable, the mobile terminal acquires a PLMN network in a PLMN list pre-stored in the mobile terminal, to perform registration. Because the PLMN list includes network information of one or more other PLMN networks that are selected and successfully registered with before, during network selection, the mobile terminal does not randomly select a PLMN network to perform registration, and therefore, a speed and efficiency of network registration performed by the mobile terminal are improved.

Preferably, in the foregoing method for selecting a PLMN, the network information of the one or more other PLMN networks that are selected and successfully registered with before includes network information of one or more other PLMN networks that are manually selected by a user and successfully registered with before.

Optionally, in the foregoing method for selecting a PLMN, the network information of the one or more other PLMN networks that are selected and successfully registered with before may further include network information of one or more other PLMN networks that the mobile terminal automatically selects and successfully registers with.

Further, in the foregoing method for selecting a PLMN, the network information includes a mobile country code MCC, a mobile network code MNC, and standard information that correspond to the PLMN network.

Specifically, Table 1 is information stored in the PLMN list. As shown in Table 1, MCCs, MNCs, and standard information that correspond to PLMNs that are selected and successfully registered with before are stored in the PLMN list, and are stored, in a form of a database, in an encrypting file system (Encrypting File System, EFS for short) partition of a mobile phone. An MCC generally includes three digits, used to uniquely identify a code of a country in which the mobile terminal is located. For example, 460 is used to identify China. An MNC generally uses two or three digits to identify a mobile network selected by a mobile terminal, where different mobile operators use different MNCs.

TABLE 1

| Country code sequence number | MCC-MNC | Mobile phone accessstandard | Type |
| --- | --- | --- | --- |
| 0 | 202-05 | GSM | UM_PLMN |
| 0 | 202-05 | UMTS | UM_PLMN |
| 1 | 204-05 | GSM | UM_PLMN |
| 1 | 204-05 | UMTS | UM_PLMN |
| ... | ... | ... | ... |
| xx | 310-260 | GSM | UM_PLMN |

Preferably, in the foregoing method for selecting a PLMN, the network information of each PLMN network included in the PLMN list is dynamically adjusted according to a least recently used (Least Recently Used, LRU for short) algorithm, to select a PLMN having a highest priority; however, the present invention is not limited thereto.

Specifically, 256 pieces of information may be stored in the PLMN list, and the PLMN list is stored in a database according to priorities in descending order, that is, a PLMN whose sequence number is 0 has a highest priority, and a PLMN whose sequence number is 255 has a lowest priority. When a new PLMN needs to be stored, first, it is checked whether the PLMN list is full. If the PLMN list is full, a record having a lowest priority is deleted, and the PLMN is inserted at the first position of the list. In this case, the newly-inserted PLMN has the highest priority, and at the same time, an existing same record is deleted from the PLMN list. When a user selects a network and fails to register with the selected network or when the terminal fails to automatically register with a network, the mobile terminal searches the PLMN list, and if a record of the network exists, deletes the record from the list.

In this embodiment, an MCC, an MNC, and standard information of one or more other PLMN networks that are manually selected by a user and successfully registered with before are stored in a PLMN list, and are dynamically adjusted and updated by using an LRU algorithm, so that a PLMN that is often selected by the user and that a mobile terminal can successfully register with is always at a position having a relatively high priority in the PLMN list. When performing network selection and trying to register with a PLMN, if the mobile terminal learns by means of determining that an RPLMN and an HPLMN that correspond to the mobile terminal are unavailable, the mobile terminal acquires a PLMN network in the PLMN list, to perform registration, rather than randomly selecting a PLMN network, thereby improving a speed and efficiency of network registration performed by the mobile terminal.

Figure 2:
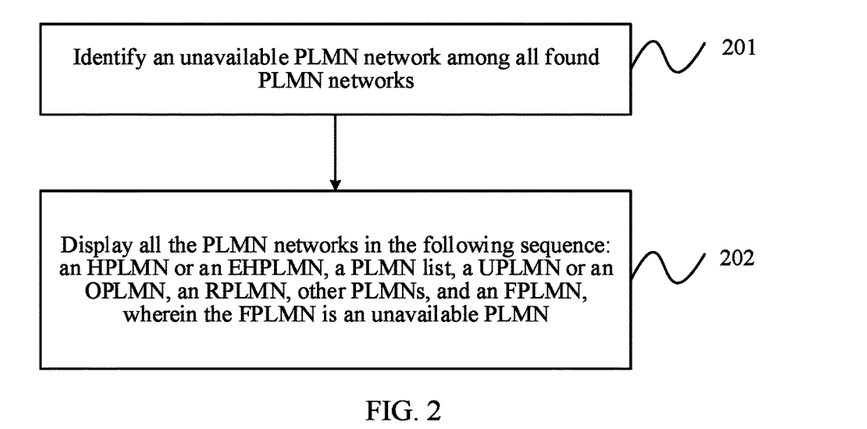
FIG. 2 is a flowchart of Embodiment 2 of a method for selecting a public land mobile network PLMN according to the present invention.

FIG. 2 is a flowchart of Embodiment 2 of a method for selecting a public land mobile network PLMN according to the present invention. Based on the foregoing embodiments, in this embodiment, an embodiment of a process in which a user manually selects a PLMN network is described in detail. As shown in FIG. 2, the method of this embodiment may include:

Step 201: Identify an unavailable PLMN network among all found PLMN networks.

A person skilled in the art may understand that, in a process in which a mobile terminal selects a PLMN, there are some PLMNs that do not meet requirements. To avoid frequently trying to select these PLMNs, a list of some unavailable PLMNs is stored in a universal subscriber identity module (Universal Subscriber Identity Module, USIM for short). After an attempt of accessing a PLMN by the mobile terminal is rejected, the PLMN is added to an FPLMN list, and the PLMN that does not meet requirements is identified. For example, a name of the network is identified by using a special symbol or a letter, to notify a user that this network is a forbidden network. A specific identifying manner is not limited in the present invention herein.

There are two manners for selecting a network by the mobile terminal: automatic network selection and manual network selection. In the prior art, when the manual network selection manner is used, the mobile terminal first attempts to select an RPLMN, to perform registration. If an NAS learns by means of determining that the RPLMN does not exist or cannot be successfully registered with, the NAS initiates a network search process, an access layer reports all found PLMNs to the NAS, and the NAS selects a PLMN according to the following sequence: an HPLMN or an EHPLMN, a UPLMN, an OPLMN, PLMNs that have good signal quality and that are sorted, and PLMNs that have poor signal quality and that are sorted according to signal strength. No matter the PLMNs are in the FPLMN list or not, the PLMNs are sorted, and a sorting result is presented to the user for selection. In this case, when the HPLMN or the EHPLMN is unavailable, and the UPLMN and OPLMN are not preset, a case in which an FPLMN having best signal quality has a highest priority may occur, and therefore, the user attempts to select the FPLMN to perform registration, causing a registration failure.

In this embodiment, the mobile terminal performs matching on a found PLMN network and PLMN networks in the FPLMN list. When it is detected that the found network corresponds to a record in the FPLMN list, the mobile terminal identifies the network, indicating that the network is a forbidden PLMN. A person skilled in the art may understand that after unavailable PLMNs among all the found PLMN networks are identified, when a user manually selects a network, the user may differentiate which networks are FPLMNs and which are available PLMNs, which avoids a problem that registration performed by the mobile terminal fails because the user selects an FPLMN, thereby improving a speed and efficiency of network registration performed by the mobile terminal.

Step 202: Display all the PLMN networks in the following sequence: an HPLMN or an EHPLMN, a PLMN list, a UPLMN or an OPLMN, an RPLMN, other PLMNs, and an FPLMN, wherein the FPLMN is an unavailable PLMN.

Specifically, in a process of manually selecting a PLMN network by a user, the mobile terminal first attempts to log into the RPLMN. When the RPLMN does not exist or after registration fails, sorting and optimizing are performed according to the following sequence: an HPLMN or an EHPLMN, a PLMN list, a UPLMN or an OPLMN, an RPLMN, other PLMNs, and an FPLMN, to list all optional networks. The found PLMNs are presented to the user in a form of a user interface (User Interface, UI for short), so that the user can rapidly identify a PLMN having a highest priority, to perform selection and complete network registration.

According to the method for selecting a public land mobile network PLMN provided in this embodiment, an unavailable PLMN network among all found PLMN networks is identified, and re-sorted networks are presented to a user for selection. When an RPLMN and an HPLMN are unavailable, the user selects a PLMN network in a PLMN list to perform registration, which avoids a problem that the user selects an FPLMN to try to perform registration because the FPLMN has best signal quality, thereby improving a speed and efficiency of network registration performed by a mobile terminal.

Particularly, in the foregoing method for selecting a PLMN, the other PLMNs are sorted according to the following method:

randomly sorting, according to signal strength, PLMNs whose signal strength is higher than a preset value; and sorting, according to signal strength in descending order, PLMNs whose signal strength is lower than the preset value.

Specifically, PLMNs whose received signal code power (Received Signal Code Power, RSCP for short) values are higher than the preset value are randomly sorted, and PLMNs whose RSCP values are lower than the preset value are sorted according to signal strength in descending order. A value of the preset value is related to settings of an operator. In this embodiment, the preset value is −84 dBm, which is not limited in the present invention thereof.

Figure 3:
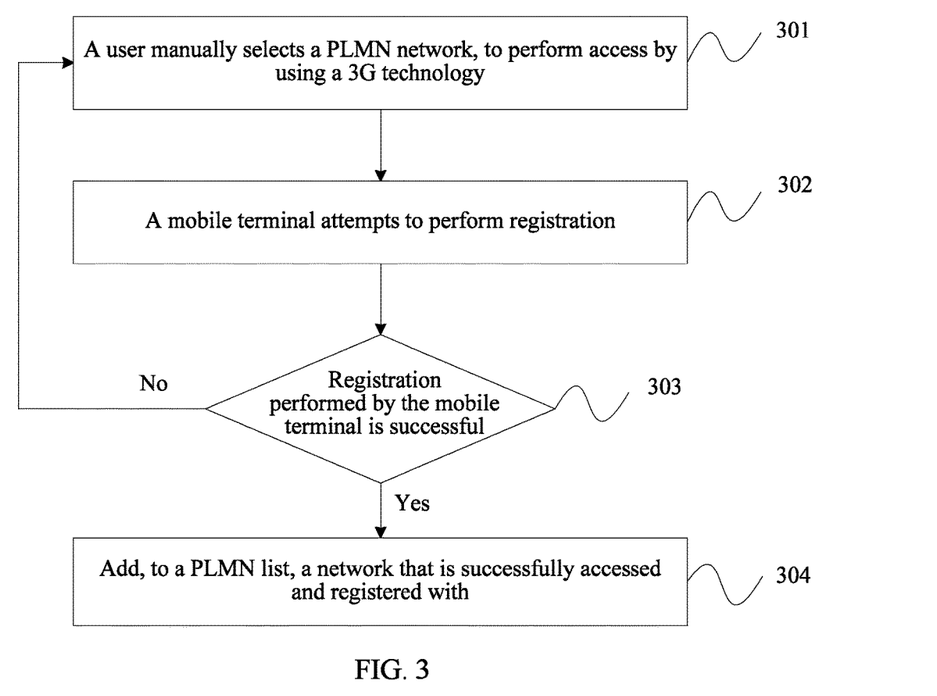
FIG. 3 is a flowchart of Embodiment 3 of a method for selecting a public land mobile network PLMN according to the present invention.

FIG. 3 is a flowchart of Embodiment 3 of a method for selecting a public land mobile network PLMN according to the present invention. Based on Embodiment 1 of the method for selecting a public land mobile network PLMN and Embodiment 2 of the method for selecting a public land mobile network PLMN, in this embodiment, an embodiment of a process of establishing a PLMN list is described in detail. As shown in FIG. 3, the method of this embodiment may include:

Step 301: A user manually selects a PLMN network (for example, a PLMN_A) to access by using a 3G technology.

Step 302: A mobile terminal attempts to perform registration.

Step 303: Determine whether registration performed by the mobile terminal is successful.

In this step, if registration performed by the mobile terminal is successful, step 304 is performed, or otherwise, step 301 is performed.

Step 304: Add, to a PLMN list, a network (for example, a PLMN_A) that is successfully accessed and registered with.

In this step, after the registration is successful, the mobile terminal adds the network to the PLMN list, and performs dynamic update according to an LRU algorithm. When the mobile terminal is turned off, restarted, or in an airplane mode, the PLMN list is automatically stored in an EFS file. When the mobile terminal is turned on or restarted, or an airplane mode is turned off, the PLMN list is automatically retrieved from the EFS file.

It should be noted that step 304 is not a necessary step of the method for selecting a public land mobile network PLMN in this embodiment of the present invention. During an actual application, step 304 may be omitted as required. Specifically, if one or more other PLMN networks that are selected and successfully registered with before are already stored in the PLMN list, during manual network selection, a user can directly select a network in the PLMN list. If the registration is successful, the mobile terminal does not need to add the PLMN network to the PLMN list again.

After the mobile terminal is turned on or restarted, or the airplane mode is turned off, the mobile terminal automatically searches for local optional networks, and selects a network according to the following sequence: an RPLMN, an HPLMN, a PLMN list, a UPLMN, an OPLMN, and other PLMNs, to perform registration. When it is learned by means of determining that the RPLMN and the HPLMN are unavailable, the mobile terminal selects a PLMN network from the PLMN list, to perform registration, so as to implement an objective of rapidly registering with an available network.

According to the method for selecting a public land mobile network PLMN provided in this embodiment of the present invention, during a process of selecting a network by a mobile terminal, a PLMN list is established by recording network information of one or more other PLMN networks that are selected and successfully registered with before. When the mobile terminal learns by means of determining that an RPLMN and an HPLMN that correspond to the mobile terminal are unavailable, the mobile terminal acquires a PLMN network in the PLMN list pre-stored in the mobile terminal, to perform registration. Because the PLMN list includes network information of one or more other PLMN networks that are selected and successfully registered with before, during network selection, the mobile terminal does not randomly select a PLMN network to perform registration, and therefore, a speed and efficiency of network registration performed by the mobile terminal are improved.

Figure 4:
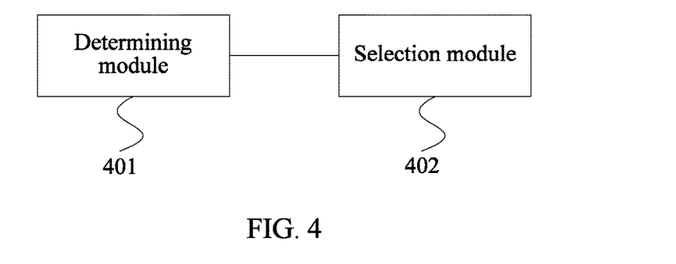
FIG. 4 is a schematic structural diagram of Embodiment 1 of an apparatus for selecting a public land mobile network PLMN according to the present invention.

FIG. 4 is a schematic structural diagram of Embodiment 1 of an apparatus for selecting a public land mobile network PLMN according to the present invention. As shown in FIG. 4, the apparatus provided in this embodiment of the present invention includes a determining module 401 and a selection module 402.

The determining module 401 is configured to: during a process of selecting a network by a mobile terminal, determine whether a registered public land mobile network RPLMN and a home public land mobile network HPLMN that correspond to the mobile terminal are available; and the selection module 402 is configured to: when it is learned that the RPLMN and the HPLMN that correspond to the mobile terminal are unavailable, acquire a PLMN network in a PLMN list pre-stored in the mobile terminal, to perform registration, where the PLMN list includes network information of one or more other PLMN networks that are selected and successfully registered with before.

According to the apparatus for selecting a public land mobile network PLMN provided in this embodiment of the present invention, during a process of selecting a network by a mobile terminal, when the mobile terminal learns by means of determining that a registered public land mobile network RPLMN and a home public land mobile network HPLMN that correspond to the mobile terminal are unavailable, the mobile terminal acquires a PLMN network in a PLMN list pre-stored in the mobile terminal, to perform registration. Because the PLMN list includes network information of one or more other PLMN networks that are selected and successfully registered with before, during network selection, the mobile terminal does not randomly select a PLMN network to perform registration, and therefore, a speed and efficiency of network registration performed by the mobile terminal are improved.

Preferably, in the foregoing apparatus for selecting a PLMN, the network information of the one or more other PLMN networks that are selected and successfully registered with before includes network information of one or more other PLMN networks that are manually selected by a user and successfully registered with before.

Optionally, referring to the foregoing apparatus for selecting a PLMN, the network information of the one or more other PLMN networks that are selected and successfully registered with before may further include network information of one or more other PLMN networks that the mobile terminal automatically selects and successfully registers with.

Further, in the foregoing apparatus for selecting a PLMN, the network information includes a mobile country code MCC, a mobile network code MNC, and standard information that correspond to the PLMN network.

Figure 5:
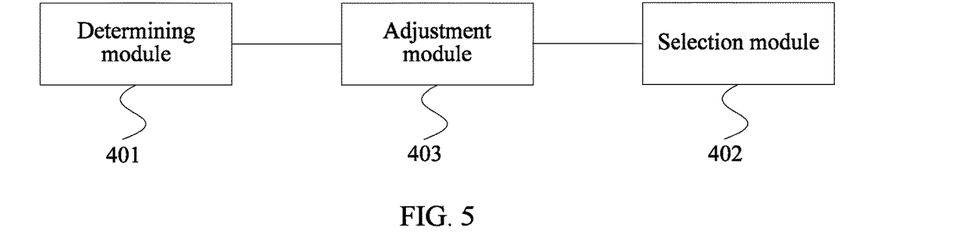
FIG. 5 is a schematic structural diagram of Embodiment 2 of an apparatus for selecting a public land mobile network PLMN according to the present invention.

FIG. 5 is a schematic structural diagram of Embodiment 2 of an apparatus for selecting a public land mobile network PLMN according to the present invention. As shown in FIG. 5, based on the structure of the apparatus shown in FIG. 4, the apparatus provided in this embodiment may further include an adjustment module 403, where the adjustment module 403 is configured to dynamically adjust, according to an LRU algorithm, the network information of each PLMN network included in the PLMN list.

According to the apparatus for selecting a public land mobile network PLMN in this embodiment, an MCC, an MNC, and standard information of one or more other PLMN networks that are manually selected by a user and successfully registered with before are stored in a PLMN list, and are dynamically adjusted and updated by using an LRU algorithm, so that a PLMN that is often selected by the user and that can be successfully registered with is always at a position having a relatively high priority in the PLMN list. When performing network selection and trying to register with a PLMN, if the mobile terminal learns by means of determining that an RPLMN and an HPLMN that correspond to the mobile terminal are unavailable, the mobile terminal acquires a PLMN network in the PLMN list to perform registration, rather than randomly selecting a PLMN network, thereby improving a speed and efficiency of network registration performed by the mobile terminal.

Figure 6:
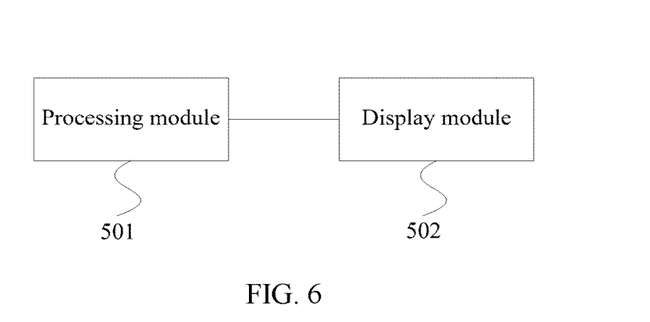
FIG. 6 is a schematic structural diagram of Embodiment 3 of an apparatus for selecting a public land mobile network PLMN according to the present invention.

FIG. 6 is a schematic structural diagram of Embodiment 3 of an apparatus for selecting a public land mobile network PLMN according to the present invention. As shown in FIG. 6, the apparatus provided in this embodiment of the present invention includes a processing module 501 and a display module 502.

The processing module 501 is configured to: during a process of manually selecting a PLMN network by the user, identify an unavailable PLMN network among all found PLMN networks.

The display module 502 is configured to display all the PLMN networks according to the following sequence: an HPLMN or an EHPLMN, a PLMN list, a UPLMN or an OPLMN, an RPLMN, other PLMNs, and an FPLMN, where the FPLMN is an unavailable PLMN.

According to the apparatus for selecting a public land mobile network PLMN in this embodiment, an unavailable PLMN network among all found PLMN networks is identified, and re-sorted networks are presented to a user for selection. When an EHPLMN and an HPLMN are unavailable, the user selects a PLMN network in a PLMN list to perform registration, which avoids a problem that the user selects an FPLMN to try to perform registration because the FPLMN has best signal quality, thereby improving a speed and efficiency of network registration performed by a mobile terminal.

Figure 7:
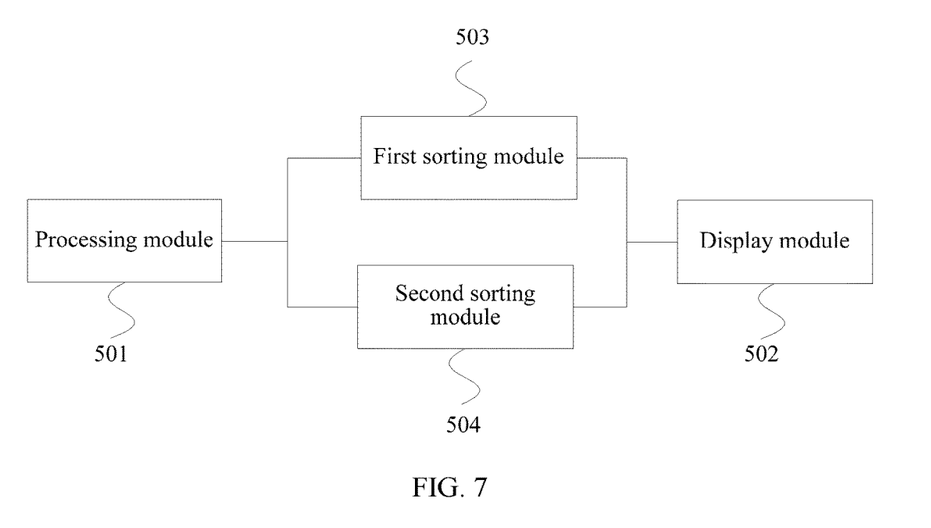
FIG. 7 is a schematic structural diagram of Embodiment 4 of an apparatus for selecting a public land mobile network PLMN according to the present invention.

FIG. 7 is a schematic structural diagram of Embodiment 4 of an apparatus for selecting a public land mobile network PLMN according to the present invention. As shown in FIG. 7, based on the structure of the apparatus shown in FIG. 6, the apparatus provided in this embodiment may further include a first sorting module 503 and a second sorting module 504, where the first sorting module 503 is configured to randomly sort, according to signal strength, PLMNs whose signal strength is higher than a preset value; and the second sorting module 504 is configured to sort, according to signal strength in descending order, PLMNs whose signal strength is lower than the preset value.

The apparatus for selecting a public land mobile network PLMN in this embodiment may be configured to execute the technical solution of the method for selecting a public land mobile network PLMN provided in any one of the embodiments of the present invention, and has a similar implementation principle and technical effect. Details are not described herein again.

Figure 8:
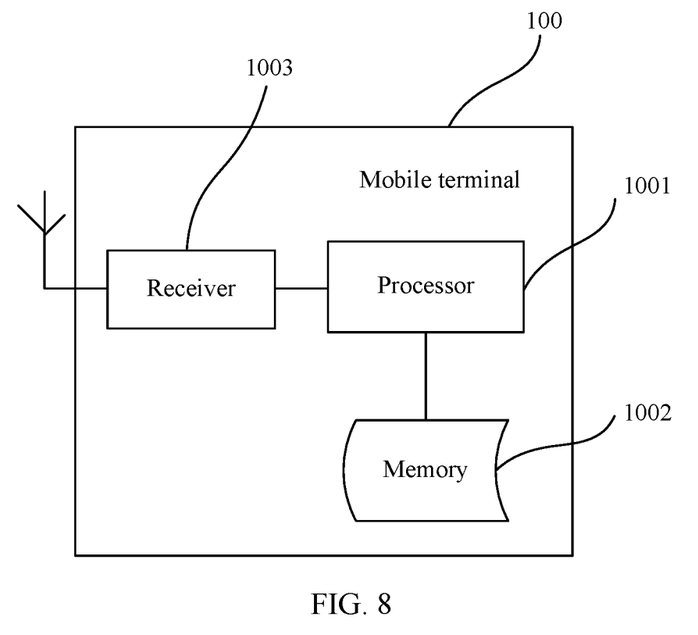
FIG. 8 is a schematic structural diagram of Embodiment 1 of a mobile terminal according to the present invention.

FIG. 8 is a schematic structural diagram of Embodiment 1 of a mobile terminal according to the present invention. As shown in FIG. 8, a mobile terminal 100 provided in this embodiment includes a processor 1001, a memory 1002, and a receiver 1003. The receiver 1003 may be connected to the processor 1001. The memory 1002 stores an execution instruction, when the mobile terminal 100 runs, the processor 1001 communicates with the memory 1002, and the processor 1001 invokes the execution instruction stored in the memory 1002, to execute the following operation:

during a process of selecting a network by a mobile terminal, if it is learned by means of determining that a registered public land mobile network RPLMN and a home public land mobile network HPLMN that correspond to the mobile terminal are unavailable, acquiring a PLMN network in a PLMN list pre-stored in the mobile terminal, to perform registration, where the PLMN list includes network information of one or more other PLMN networks that are selected and successfully registered with before.

Optionally, the network information of the one or more other PLMN networks that are selected and successfully registered with before includes network information of one or more other PLMN networks that are manually selected by a user and successfully registered with before.

Optionally, the network information includes a mobile country code MCC, a mobile network code MNC, and standard information that correspond to the PLMN network.

Optionally, the network information of each PLMN network included in the PLMN list is dynamically adjusted according to a least recently used LRU algorithm.

Optionally, during a process of manually selecting a PLMN network by the user, an unavailable PLMN network among all found PLMN networks is identified.

Optionally, after the identifying an unavailable PLMN network among all found PLMN networks, the method further includes:

displaying all the PLMN networks in the following sequence: an HPLMN or an equivalent home public land mobile network EHPLMN, a PLMN list, a user selected public land mobile network UPLMN or an operator provided public land mobile network OPLMN, an RPLMN, other PLMNs, a forbidden public land mobile network FPLMN, where the FPLMN is an unavailable PLMN.

Optionally, the other PLMNs are sorted according to the following method:

randomly sorting, according to signal strength, PLMNs whose signal strength is higher than a preset value; and sorting, according to signal strength in descending order, PLMNs whose signal strength is lower than the preset value.

The mobile terminal in this embodiment may be configured to execute the technical solution of the method for selecting a public land mobile network PLMN provided in any one of the embodiments of the present invention, and has a similar implementation principle and technical effect. Details are not described herein again.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for selecting a public land mobile network (PLMN), comprising:
during a process of selecting a network by a mobile terminal, if it is learned by means of determining that a registered public land mobile network (RPLMN) and a home public land mobile network (HPLMN) corresponding to the mobile terminal are unavailable, acquiring a PLMN network in a PLMN list pre-stored in the mobile terminal to perform a registration, wherein the PLMN list comprises network information of one or more other PLMN networks that are selected and successfully registered, identifying an unavailable PLMN network among found PLMN networks, and displaying a forbidden public land mobile network (FPLMN) wherein the FPLMN is the unavailable PLMN, and wherein the network information of the one or more other PLMN networks that are selected and successfully registered comprises the network information of the one or more other PLMN networks that are manually selected by a user and successfully registered;
during the process of manually selecting a PLMN network by the user, identifying the unavailable PLMN network among found PLMN networks;
after identifying the unavailable PLMN network among all found PLMN networks, displaying the PLMN networks in the following sequence: an HPLMN or an equivalent home public land mobile network (EHPLMN), a PLMN list, a user controlled public land mobile network (UPLMN) or an operator controlled public land mobile network (OPLMN), an RPLMN, other PLMNs, and the FPLMN, wherein the FPLMN is the unavailable PLMN, and wherein the other PLMNs are sorted according to following steps:
randomly sorting, according to signal strength, PLMNs whose signal strength is higher than a preset value; and
sorting, according to signal strength in descending order, PLMNs whose signal strength is lower than the preset value.

2. The method according to claim 1, wherein the network information comprises a mobile country code (MCC), a mobile network code (MNC), and standard information that correspond to the PLMN network.

3. The method according to claim 2, wherein the network information of each PLMN network comprised in the PLMN list is dynamically adjusted according to a least recently used (LRU) algorithm.

4. The method according to claim 2, wherein the method further comprises: during the process of manually selecting a PLMN network by the user, identifying the unavailable PLMN network among found PLMN networks.

5. The method according to claim 3, wherein the method further comprises: during the process of manually selecting a PLMN network by the user, identifying the unavailable PLMN network among found PLMN networks.

6. An apparatus for selecting a public land mobile network (PLMN), comprising:
a memory storing instructions; and
a processor coupled to the memory to execute the instructions to:
during a process of selecting a network by a mobile terminal, if it is learned by means of determining that a registered public land mobile network (RPLMN) and a home public land mobile network (HPLMN) corresponding to the mobile terminal are unavailable, acquire a PLMN network in a PLMN list pre-stored in the mobile terminal to perform a registration, where the PLMN list includes network information of one or more other PLMN networks that are selected and successfully registered and the network information comprises the network information of the one or more other PLMN networks that are manually selected by a user and successfully registered,
during a process of manually selecting a PLMN network by the user, identify an unavailable PLMN network among found PLMN networks;
display all the PLMN networks in the following sequence: an HPLMN or an equivalent home public land mobile network (EHPLMN), a PLMN list, a user controlled public land mobile network (UPLMN) or an operator controlled public land mobile network (OPLMN), an RPLMN, other PLMNs, and a forbidden public land mobile network (FPLMN), wherein the FPLMN is the unavailable PLMN;
randomly sort, according to signal strength, PLMNs whose signal strength is higher than a preset value; and
sort, according to signal strength in descending order, PLMNs whose signal strength is lower than the preset value.

7. The apparatus according to claim 6, wherein the network information comprises a mobile country code (MCC), a mobile network code (MNC), and standard information that correspond to the PLMN network.

8. The apparatus according to claim 7, wherein the network information of each PLMN network included in the PLMN list is dynamically adjusted according to a least recently used (LRU) algorithm.

9. The apparatus according to claim 7, wherein the processor further executes the instructions to: during a process of manually selecting a PLMN network by the user, identify an unavailable PLMN network among found PLMN networks.

10. The apparatus according to claim 8, wherein the processor further executes the instructions to: during a process of manually selecting a PLMN network by the user, identify an unavailable PLMN network among found PLMN networks.

* * * * *